(12) United States Patent
Amis et al.

(10) Patent No.: US 8,830,240 B1
(45) Date of Patent: Sep. 9, 2014

(54) UNIVERSAL STACK ANALYZER

(75) Inventors: Alan D. Amis, Plano, TX (US); George A. Deprez, Parker, TX (US); Terry J. Hammer, Cedar Rapids, IA (US); Michael D. Dzado, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 253 days.

(21) Appl. No.: 13/250,341

(22) Filed: Sep. 30, 2011

(51) Int. Cl.
 *G06T 11/20* (2006.01)
 *H04L 12/26* (2006.01)
 *G06F 11/32* (2006.01)

(52) U.S. Cl.
 USPC ........................................... 345/440; 709/224

(58) Field of Classification Search
 CPC .................................................... H04L 43/045
 USPC ......................................................... 345/440
 See application file for complete search history.

(56) References Cited

U.S. PATENT DOCUMENTS

| | | | | |
|---|---|---|---|---|
| 5,634,009 | A * | 5/1997 | Iddon et al. | 709/223 |
| 6,269,396 | B1 * | 7/2001 | Shah et al. | 709/223 |
| 6,615,253 | B1 * | 9/2003 | Bowman-Amuah | 709/219 |
| 6,801,756 | B1 * | 10/2004 | Agrawal et al. | 455/67.11 |
| 7,020,697 | B1 * | 3/2006 | Goodman et al. | 709/223 |
| 7,562,134 | B1 * | 7/2009 | Fingerhut et al. | 709/224 |
| 7,562,156 | B2 * | 7/2009 | Phadke | 709/246 |
| 2003/0058277 | A1 * | 3/2003 | Bowman-Amuah | 345/765 |
| 2003/0157895 | A1 * | 8/2003 | Agrawal et al. | 455/67.1 |
| 2005/0013310 | A1 * | 1/2005 | Banker et al. | 370/401 |
| 2006/0007858 | A1 * | 1/2006 | Fingerhut et al. | 370/229 |
| 2010/0091664 | A1 * | 4/2010 | Nandy et al. | 370/242 |
| 2010/0332617 | A1 * | 12/2010 | Goodwin et al. | 709/219 |
| 2011/0173342 | A1 * | 7/2011 | Cooper et al. | 709/233 |
| 2012/0135779 | A1 * | 5/2012 | Kundargi et al. | 455/522 |
| 2012/0198541 | A1 * | 8/2012 | Reeves | 726/13 |
| 2012/0275311 | A1 * | 11/2012 | Ivershen et al. | 370/241 |
| 2012/0324091 | A9 * | 12/2012 | Raleigh et al. | 709/224 |
| 2013/0064328 | A1 * | 3/2013 | Adnani et al. | 375/340 |

* cited by examiner

*Primary Examiner* — Jeffery A Brier
(74) *Attorney, Agent, or Firm* — Donna P. Suchy; Daniel M. Barbieri

(57) ABSTRACT

The present invention is a universal stack analyzer which is configured for collecting data at (ex.—from) all layers of a stack and filtering the collected data to isolate selected data included in the collected data. The selected data is selected via user inputs provided to a user interface of the universal stack analyzer and filtering of the collected data to isolate the selected data from the collected data is performed based upon filters generated in response to the received user inputs. The selected data is then displayed via a graphical viewer of the stack analyzer in a user-friendly graphical format. The universal stack analyzer is waveform-agnostic.

20 Claims, 6 Drawing Sheets

UNIVERSAL STACK ANALYZER

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of FA8650-06-D-7636.

FIELD OF THE INVENTION

The present invention relates to the field of data handling systems and particularly to a universal stack analyzer.

BACKGROUND OF THE INVENTION

Currently available data handling systems (ex.—packet analyzers) may be limited in the manner in which they capture data. Further, these currently available packet analyzers may not allow for the captured data to be navigated through, re-filtered and/or viewed in a manner which provides a desirable level of user convenience. Still further, these currently available packet analyzers may not provide a desirable level of versatility. Thus, it would be desirable to provide a system which addresses and/or overcomes the above-referenced problems associated with the above-referenced current solutions.

SUMMARY OF THE INVENTION

Accordingly, an embodiment of the present invention is directed to a universal stack analyzer, including: a shared memory database; a user interface, the user interface being connected to the shared memory database; a parser, the parser being connected to the user interface and the shared memory database; and a graphical viewer, the graphical viewer being connected to the parser, wherein the universal stack analyzer is configured for receiving data from multiple layers of a stack node (ex.—waveform stack node) connected to the universal stack analyzer and for providing a graphical depiction of selected data included in the received data via the graphical viewer.

An additional embodiment of the present invention is directed to a method for displaying selected data via a universal stack analyzer, the method including: receiving data at the stack analyzer, the data being received from multiple layers of a stack node; storing the received data in a shared memory database of the analyzer; receiving a user input via a user interface of the stack analyzer; generating a filter via the user interface, the filter being based upon the received user input; isolating selected data from the received data based upon the filter; providing the selected data to a graphical viewer of the stack analyzer; and providing a display output via the graphical viewer, the display output including a graphical depiction of the selected data.

A further embodiment of the present invention is directed to a computer program product, including: a non-transitory computer-readable storage medium including computer-usable program code for performing a method for displaying selected data via a universal stack analyzer, the computer program product including: computer-usable program code for receiving data at the stack analyzer, the data being received from multiple layers of a stack node; computer-usable program code for storing the received data in a shared memory database of the analyzer; computer-usable program code for receiving a user input via a user interface of the stack analyzer; computer-usable program code for generating a filter via the user interface, the filter being based upon the received user input; computer-usable program code for isolating selected data from the received data based upon the filter; computer-usable program code for providing the selected data to a graphical viewer of the stack analyzer; and computer-usable program code for providing a display output via the graphical viewer, the display output including a graphical depiction of the selected data.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present disclosure may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Currently available data handling systems (ex.—packet analyzers) capture and display packet information (ex.—data) in bits and bytes. However, by capturing and displaying packet information in the above-referenced manner, currently available packet analyzers do not allow a user to navigate through or re-filter the captured data from a graphical global view. Further, the currently available packet analyzers only capture data at (ex.—from) a physical layer of a stack (ex.—stack node). However, during development, integration and/or testing, software developers, system integrators and/or test engineers may desire to have a packet analyzer which captures the data at (ex.—from) all layers of the stack. Having a stack analyzer which provides visibility to data packets as they traverse down the stack may provide a quick turnaround for the software developers, system integrators and test engineers.

In the present disclosure, embodiment(s) of a stack analyzer are disclosed. In the embodiment(s) disclosed herein, the stack analyzer of the present disclosure may: 1) be waveform agnostic; 2) collect data at all layers of the stack; 3) provide graphical iconic storybook timelines; and 4) provide individual packet dumps. Thus, the present disclosure may disclose an architecture that provides a stack analyzer which is capable of capturing and displaying packet data at (ex.—from) all layers of the stack in a user-friendly graphical format and may be used with a large variety of (ex.—all) waveforms. By providing a way to capture and graphically view data at all layers of the stack, the stack analyzer of the present disclosure may promote improved performance and quality over currently available packet analyzers, and may also promote reductions in the development and/or the debug life cycle.

Figure 1:
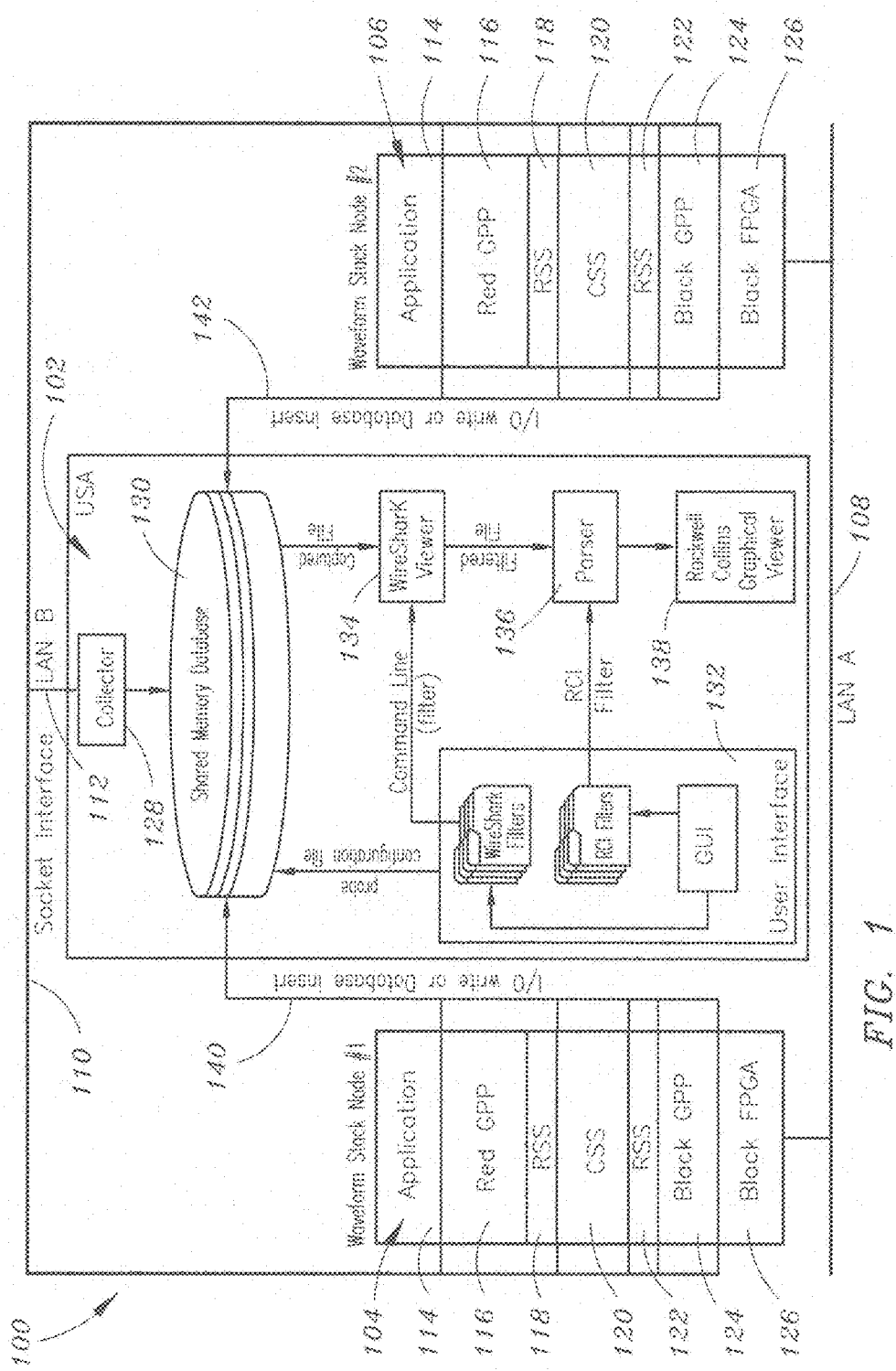
FIG. 1 is a block diagram schematic of a conceptual architecture including a universal stack analyzer in accordance with an exemplary embodiment of the present disclosure.

Referring to FIG. 1, a conceptual architecture in accordance with an embodiment of the present disclosure is shown. In exemplary embodiments, the architecture (ex.—system) 100 may include a stack analyzer 102. For example, the stack analyzer 102 may be a universal stack analyzer 102. The universal stack analyzer 102 may be connected to (ex.—communicatively coupled with) a first stack node 104. In further embodiments, the stack analyzer 102 may also be connected to (ex.—communicatively coupled with) a second stack node 106. For instance, the stack nodes (104, 106) may be tactical waveform stacks. In further embodiments, the stack nodes (104, 106) may be connected to (ex.—communicatively coupled with) a first local area network (LAN) 108 (ex.—LAN A) and a second local area network (LAN) 110 (ex.—LAN B). In still further embodiments, the universal stack analyzer 102 may be connected to (ex.—communicatively coupled with) the first LAN 108 via the stack nodes (104, 106). In further embodiments, the universal stack analyzer 102 may be connected to (ex.—communicatively coupled with) the second LAN 110 via an interface (ex.—a socket interface) 112.

In exemplary embodiments of the present disclosure, the stack nodes (104, 106) may each include a plurality of layers, including both physical and non-physical layers. For example, each stack node (104, 106) may include the following layers: an application layer 114; a first General Purpose Process (GPP) layer 116 (ex.—Red GPP); a first Radio Security Services (RSS) layer 118; a Cryptographic Sub-System (CSS) layer 120; a second RSS layer 122; a second GPP layer 124 (ex.—Black GPP); and a Field Programmable Gate Array (FPGA) layer 126 (ex.—Black FPGA).

In an embodiment of the present disclosure, the universal stack analyzer 102 may include a collector 128. Further, the universal stack analyzer 102 may include a shared memory database 130, the shared memory database being connected to the collector 128. Still further, the universal stack analyzer 102 may include a user interface (ex.—including a Graphical User Interface (GUI)) 132, the user interface 132 being connected to the shared memory database 130. Further, the universal stack analyzer 102 may include a first viewer (ex.—a WireShark viewer) 134, the first viewer 134 being connected to the user interface 132 and the shared memory database 130.

Still further, the universal stack analyzer 102 may include a parser 136, the parser 136 being connected to the first viewer 134 and the user interface 132. Further, the universal stack analyzer 102 may include a second viewer (ex.—a graphical viewer) 138, the graphical viewer 138 being connected to the parser 136. The universal stack analyzer 102 may further include data processing functionality (ex.—a processor).

In exemplary embodiments of the present disclosure, the universal stack analyzer 102 is configured for receiving (ex.—capturing) data (ex.—traffic; messages) from multiple (ex.—all; both physical and non-physical) layers of the nodes (104, 106) and is further configured for transmitting data to the nodes (104, 106). Further, the universal stack analyzer 102 is configured for allowing a user to dictate (ex.—via the user interface 132) which data is to be captured and/or may filter (ex.—isolate or separate out) desired data from amongst the transmitted and received data so that the captured and/or filtered data may be viewed by the user via the graphical viewer 138.

In an embodiment of the present disclosure, captured (ex.—received) data may be stored in the shared memory database 130 of the analyzer 102. In exemplary embodiments, the nodes (104, 106) may be configured for providing data to the shared memory database 130 via one or more interfaces (ex.—buses) (112, 140, 142). For example, during a network simulation, data may be written by the node(s) (104, 106) directly into the shared memory database 130 in a location(s) dedicated for the particular node(s) (104, 106) with a timestamp. For instance, traffic may be transmitted from the nodes (104, 106) to the analyzer 102 via an HLA bus or via radio (or radio hardware) attenuators. In further embodiments, in order to promote mitigation of network traffic congestion, the second LAN 110 (ex.—a separate LAN 110) may be implemented such that data may be provided from the different layers of the stack nodes (104, 106) to the shared memory database 130 via the second LAN 110 and the collector 128. For instance, the data collector 128 of the analyzer 102 may receive data sent from the nodes (ex.—tactical waveform stacks) (104, 106) via the socket interface 112, such as when radios or radio hardware are/is being used. The socket interface 112 to the collector 128 may be constructed via debug_trace( ) extensions or a new f_probe( ) function call. For example, traffic collection may be instrumented in waveform code as extensions to a current debug trace or via a new function call, f_probe( ). The new function, f_probe( ) would be inserted into the waveform code at all places where data could be collected. Appropriate wrappers would be inserted to mitigate any unnecessary processing. In further embodiments, an Ethernet card (ex.—an additional Ethernet card) may be added to the PC/radio to allow for the second LAN 110 in support of capturing data from various layers of the stack nodes (ex.—stacks) (104, 106). In still further embodiments, data may be captured at different layers of the stack(s) (104, 106) and sent to the collector 128 of the stack analyzer 102. This may be done in order to analyze messages as they flow up and down the stacks (104, 106) and to insure that proper processing is performed at the different layers of the stacks (104, 106).

As mentioned above, after the data is captured by the analyzer 102 (ex.—in the database 130 of the analyzer 102), the data may be selectively filtered to separate out desired data from the captured data so that the desired data may be viewable by a user via the graphical viewer (ex.—display) 138 of the analyzer 102. For example, captured traffic may be filtered based on offline user sessions which define the traffic that is to be displayed via the graphical viewer 138. In further embodiments, the user interface 132 is configured for generating filters which may be utilized by the parser 136 when preparing data (ex.—separated out data, filtered data) for display by the graphical viewer 138. Further, the filters generate a probe configuration file which identifies the portion(s) of the stack(s) (104, 106) where data needs to be collected. Still further, the WireShark viewer 134 may be configured for filtering data (ex.—captured data; captured files) which have been captured in the database 130. For example, specific inputs received via the user interface 132 may be translated by the analyzer 102 (ex.—via a filter functional block of the analyzer 102) into appropriate (ex.—desired) WireShark command line inputs and filters. Further, the analyzer 102 (ex.—via the filter functional block of the analyzer 102) may then invoke WireShark functionality of the analyzer 102 to run (ex.—to function).

As mentioned above, the parser 136 may be configured for parsing and filtering the captured traffic/data to prepare the data for display (ex.—to provide a filter output for display), such that the prepared data (ex.—filter output) may be provided to the graphical viewer 138 and may be displayed via the graphical viewer 138 as a display output. In further embodiments, the parser 136 may be configured for parsing and filtering captured traffic for non-standard logical events (ex.—events which are not supported by WireShark). For example, traffic for non-standard logical events may include messages which have a change in time ($\Delta T$) value which is greater than a pre-determined value defined in the filter. The parser 136 may be configured for performing the appropriate operations for making such determinations and may add the occurrences to the filter output which may be provided to the graphical viewer 138 and displayed as a display output. Logical expressions may include but are not limited to: "AND"; "OR"; "≤"; "≥"; "="; and "≠".

Figure 2:
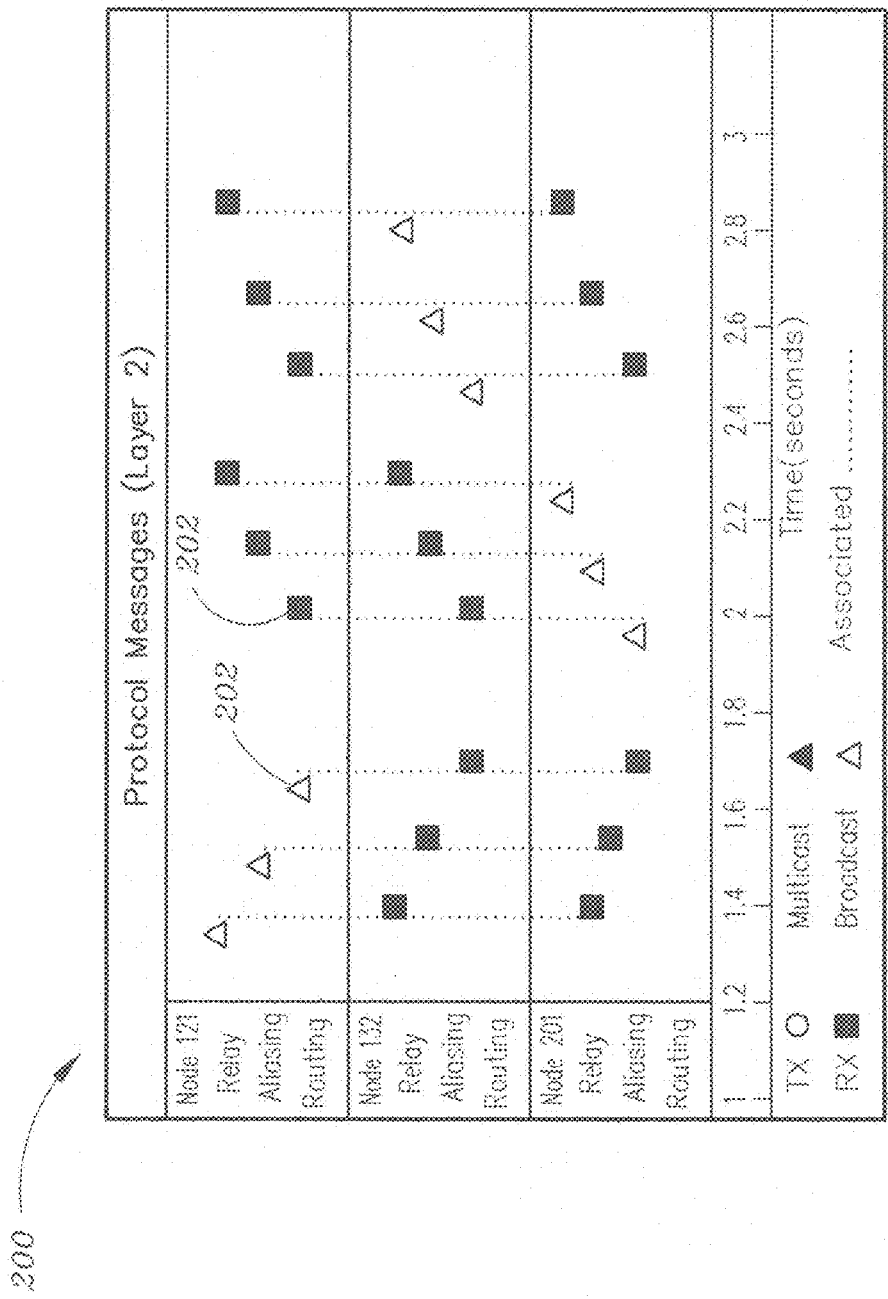
FIG. 2 is a conceptual diagram (ex.—screen shot) of a possible display output (ex.—graphical depiction) which may be provided via the universal stack analyzer of FIG. 1, the depiction including selected data (ex.—protocol traffic) in accordance with a further exemplary embodiment of the present disclosure.

As mentioned above, data may be selectively captured (ex.—from layers of the stacks (104, 106)) and/or filtered by the parser 136 of the analyzer 102 (ex.—based upon user inputs provided via the user interface 132 of the analyzer 102) to provide a filter output which may be provided to the graphical viewer 138. The graphical viewer 138 may then provide a display output based upon the filter output, the display output displaying the selected data. In exemplary embodiments of the present disclosure, a user may want to capture and display traffic (ex.—protocol traffic) sent to or received from a specific node (104, 106). Such a use case may require the user to specify source and destination addresses of the nodes in question and any specifics regarding the type of traffic, for instance, the relay node messages, node aliasing or routing tables. FIG. 2 illustrates a conceptual diagram of a possible display output 200 which may be provided via the graphical viewer 138 of the analyzer 102 to display the traffic (ex.—protocol traffic) collected. Once the traffic (ex.—messages) are displayed graphically utilizing corresponding graphical icons 202 (as shown in FIG. 2), a user may provide a further user input (ex.—user may select (ex.—user may click on) an icon 202 shown in the display output 200) in order to view an underlying format of the message associated with the selected graphical icon 202. By selecting the icon 202, a WireShark tool may be activated and a further display output displaying the contents of the message corresponding to the selected icon 202 may be displayed by the analyzer 102.

Figure 3:
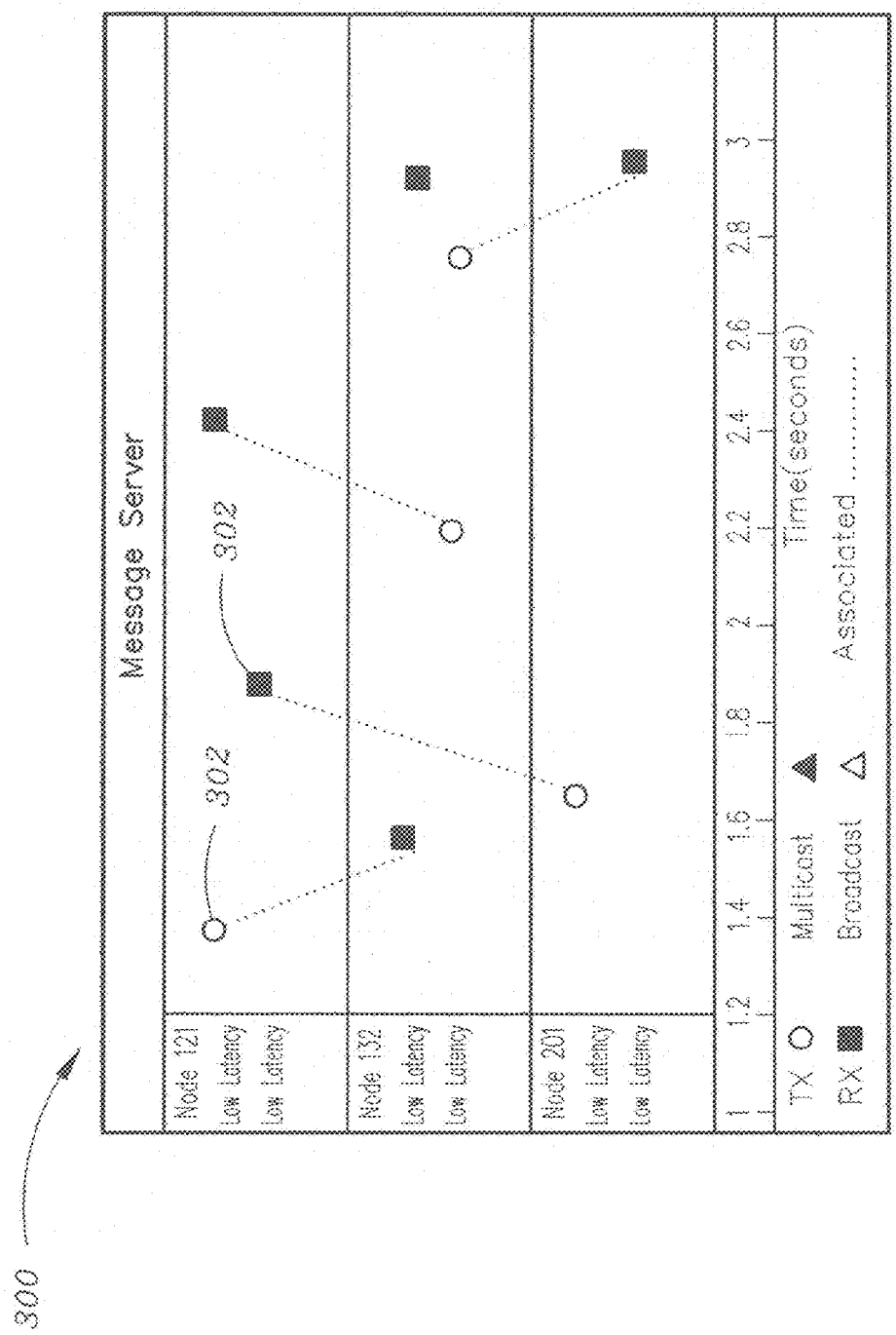
FIG. 3 is a conceptual diagram of a possible display output (ex.—graphical depiction) which may be provided via the universal stack analyzer of FIG. 1, the depiction including selected data (ex.—logical exceptions) in accordance with a further exemplary embodiment of the present disclosure.

In exemplary embodiments of the present disclosure, a user may want the analyzer 102 to capture and display when logical exceptions occur (ex.—as defined by a test engineer). Such capability may be especially useful for scripting and automating a final quality test (FQT). As an example, the test engineer may want to view all low latency messages which have $\Delta T$ values which are greater than a pre-determined $\Delta T$ value defined in the filter. There are many different logical expressions that could be created to filter the captured data. FIG. 3 illustrates a conceptual diagram of a possible display output 300 which may be provided via the graphical viewer 138 of the analyzer 102 to display logical exceptions. Further, a user input screen may be provided via the analyzer 102 to allow the user to define logical expressions (via user inputs) to use for filtering the captured data. The logical exceptions may be indicated graphically in the display output via icons 302. Once the traffic (ex.—messages) are displayed graphically utilizing corresponding graphical icons 302 (as shown in FIG. 3), a user may provide a further user input (ex.—user may select (ex.—user may click on) an icon 302 shown in the display output 300) in order to view an underlying format of the message associated with the selected graphical icon 302. By selecting the icon 302, a WireShark tool may be activated and a further display output displaying the contents of the message corresponding to the selected icon 302 may be displayed by the analyzer 102.

Figure 4:
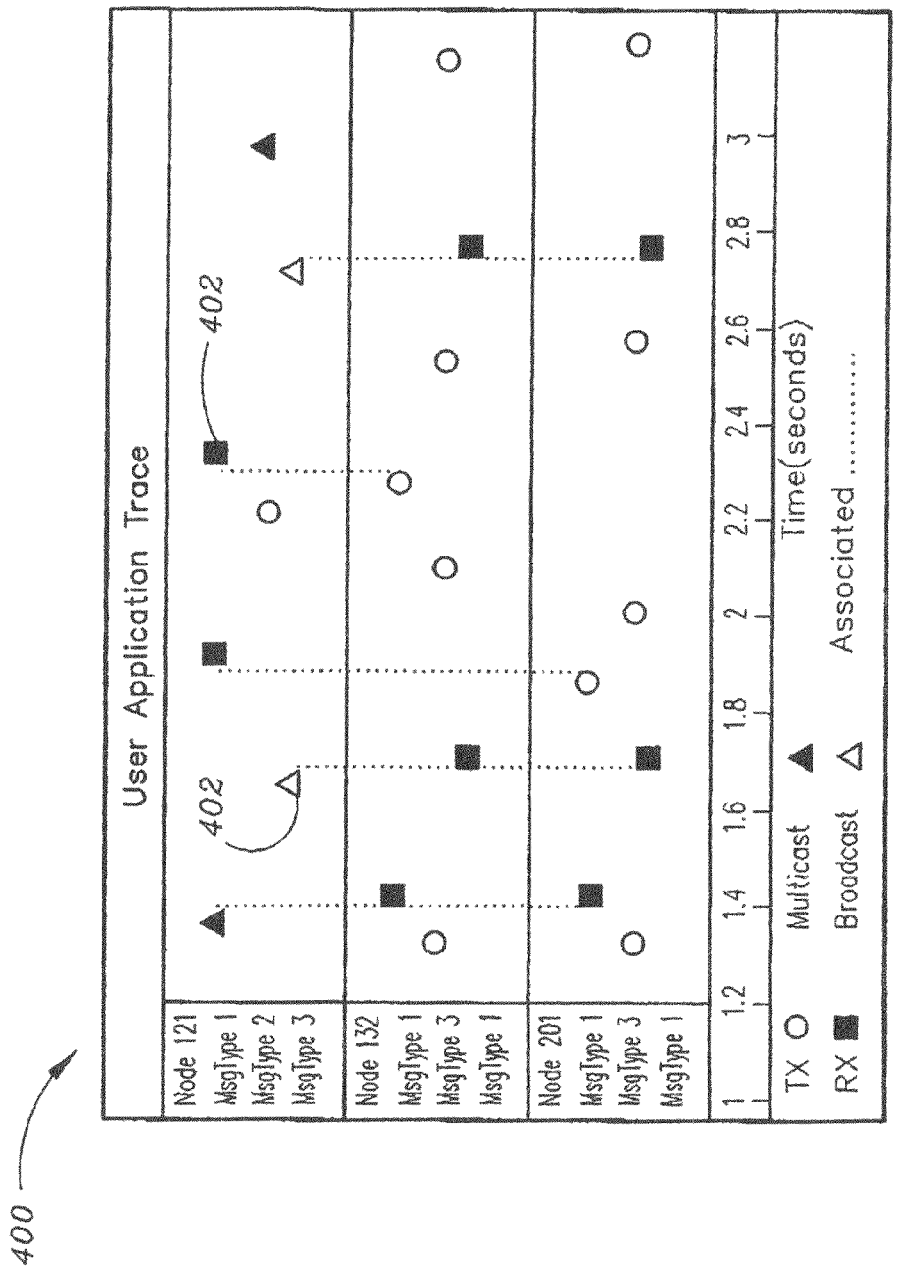
FIG. 4 is a conceptual diagram of a possible display output (ex.—graphical depiction) which may be provided via the universal stack analyzer of FIG. 1, the depiction including user-selected data (ex.—collected or captured application traffic, user application data; user application traffic) in accordance with a further exemplary embodiment of the present disclosure.

In an embodiment of the present disclosure, a user may want the analyzer 102 to capture and display application traffic which is sent to or received from a specific node(s) (104, 106). Such a use case may require that the user specify source and destination addresses of the node(s) in question and any specifics regarding the application traffic. FIG. 4 illustrates a conceptual diagram of a possible display output 400 which may be used for displaying user-selected data (ex.—collected or captured application traffic, user application data; user application traffic). The application traffic (ex.—application messages) may be displayed graphically via corresponding graphical icons 402. Once the application traffic (ex.—application messages) are displayed graphically utilizing corresponding graphical icons 402 (as shown in FIG. 4), a user may provide a further user input (ex.—user may select (ex.—user may click on) an icon 402 shown in the display output 400) in order to view an underlying format of the message associated with the selected graphical icon 402. By selecting the icon 402, a WireShark tool may be activated and a further display output displaying the contents of the message corresponding to the selected icon 402 may be displayed by the analyzer 102.

In exemplary embodiments of the present disclosure, the universal stack analyzer (USA) 102 may be inserted into a simulation environment to capture and display traffic of interest. In further embodiments, the USA 102 may be inserted into real hardware, such as mobile radio hardware, to capture and display traffic of interest. Further, the USA 102 may be utilized on a multitude of different waveforms. This may be realized by designing the USA 102 such that all waveform specifics are development and implemented as plug-ins. The base functionality of the USA 102 may be generic with no pre-conceived waveform. With this in mind, the waveform specific data formats would be written and plugged into the USA 102 to extend its capabilities for that particular waveform. The first example of plug-ins would be for a tactical waveform.

Figure 5:
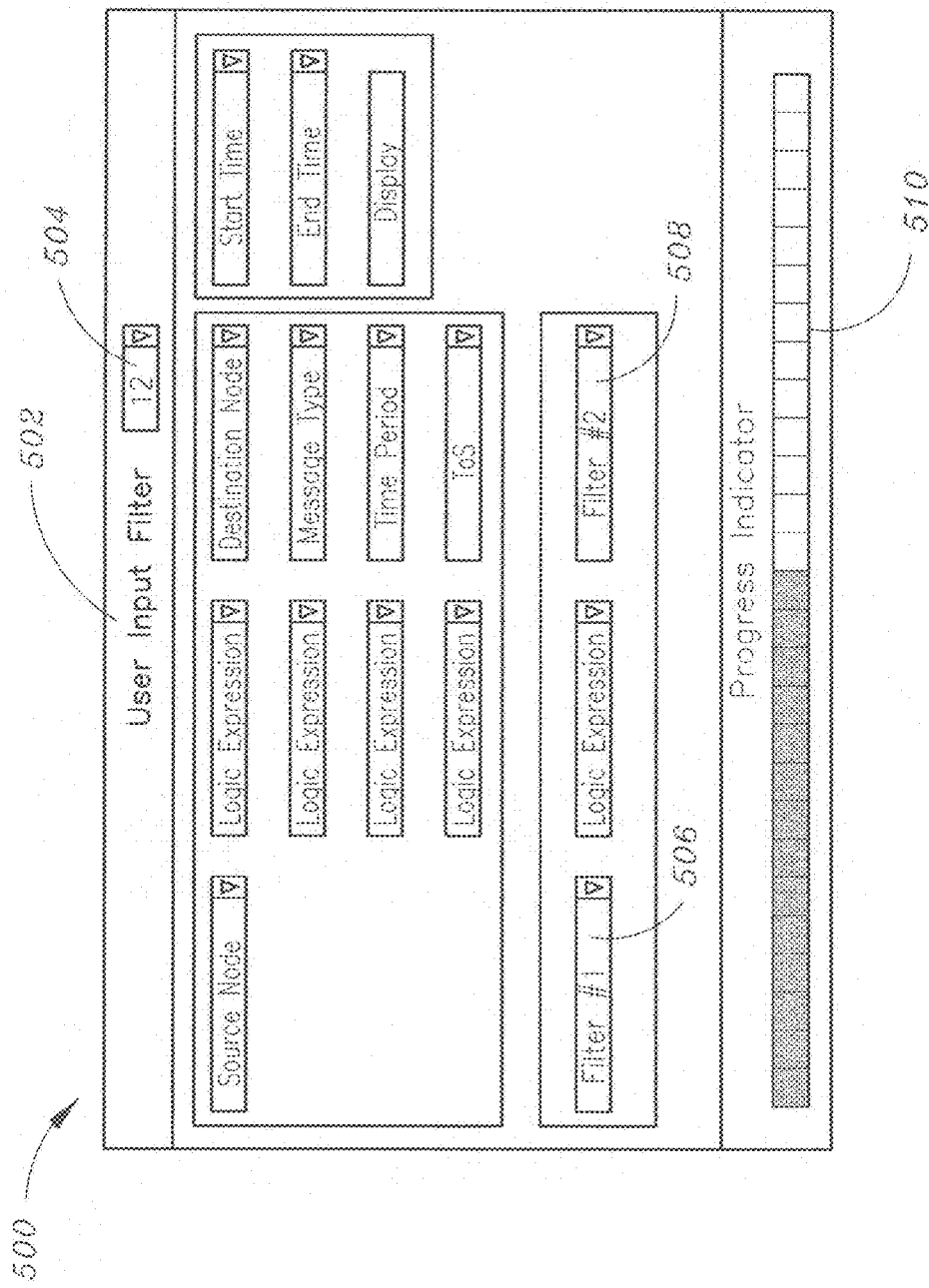
FIG. 5 is a conceptual diagram of a possible user input window which may be displayed via the universal stack analyzer of FIG. 1, the user input window allowing a user to provide inputs for determining which data is to be filtered and displayed by the analyzer in accordance with an exemplary embodiment of the present disclosure.

In embodiments of the present disclosure, the user interface 132 of the analyzer 102 may provide display a user input window 500 (as shown in FIG. 5), for allowing a user to provide inputs for determining which data is to be filtered and displayed by the analyzer 102. A User Input Filter title 502 may appear at the top of the window 500 along with a drop-down menu (ex.—drop-down number box) 504 which may be automatically assigned when the filter is opened and created. The drop-down number box (ex.—pull-down number box) 504 may allow the user to navigate to other created filters for modification and display. The user input window 500 may allow the user to specify what type of data is to be captured and displayed. The user input screen 500 may include (but is not limited to having) the following fields: a source node field; a destination node field; a message type field; a time period field; logic expression fields; a start time field; an end time field; a display field; a Type of Service (ToS) field; and filter fields (506, 508). For instance, the fields may be configured as drop-down menus from which the user may select from one of a plurality of entry options for providing an input parameter via the fields. Further, the window 500 may also include a progress indicator 510.

In exemplary embodiments of the present disclosure, the source node field may allow for entry (ex.—selection) of a node ID of the node (104, 106) generating a particular message that is to be captured and displayed. Possible values for the source node field may be "All", or any specific node ID in the simulation. Further, the destination node field may allow for entry of a node ID of the node (104, 106) receiving a particular message that is to be captured and displayed. Possible values for the destination node field may be "All", or any specific node ID in the simulation. Further, the message type field may allow for entry of a type of message that is to be captured and displayed. Possible values for the message type field may be "All", any of the user application message types, protocol message types, Multicast, Broadcast, or the like.

The time period field may allow for entry of a description of an amount of delay between when a message is sent from a source node (ex.—stack 104) until the message is received by a destination node (ex.—USA 102). The logic expression field may allow for entry of an arithmetic or logical expression that describes a relationship of the particular message between its source and destination nodes, and additional parameters. For instance, to capture and display all messages between a source and destination node, the logical expression that may be entered or selected into or from a logic expression field may be "AND". In a further example, in order to capture and display low latency messages with a ΔT value (ex.—time period value) greater than 800 microseconds (msec) between a first node (having a node ID of "121") and a second node (having a node ID of "201"), the entry or selection provided via the source node field may be "121" and the destination node field entry may be "201", an entry or selection provided via a first logic expression field may be "AND", an entry or selection from/into a message type field may be "Low Latency", an entry or selection from/into a second logic expression field may be "AND", an entry or selection provided via the time period field may be "0.8" and an entry or selection provided via a third logic expression field may be "≥". Possible logic expressions may include but are not limited to: "AND"; "OR"; "≤"; "≥"; "="; and "≠".

The start time field may allow for entry/selection of a time at which a particular filtering of data is to begin. For example, any data captured prior to the start time entered via the start time field may be ignored for a particular filter associated with the entered start time. Further, the entered/selected start time may be any value ranging from zero to a time at which the most recently captured data was captured by the analyzer 102. Further, the end time field may allow for entry/selection of a time at which a particular filtering of data is to end. For instance, any data captured after the end time entered via the end time field may be ignored for a particular filter associated with the entered end time. The display field may be a touch screen or button click selection option in the window 500. The display field, when selected, may allow for a user to view filtered data corresponding to a particular filter. The progress indicator 510 may allow for viewing of the progress of a particular filter. The display field should only be selected when the progress indicator indicates that the corresponding particular filter has completed. In further embodiments, when implementing the window 500, basic filters may be created and used to form more advanced filters. The lower portion of the window 500 has filter fields (506, 508) which may be pull-down menus to be used for combining previously created filters by using a logic expression between two base filters. An example of where this type of filtering may be useful is if two flows of data overlap in time, but the time is unknown. A first filter may be set up via the first filter field 506 to trace a first flow of data between a source and destination node, and a second filter may be set up via the second filter field 508 to trace a second flow of data between its source and destination nodes.

In embodiments of the present disclosure, the analyzer 102 may be configured or established in any of a number of various modes of operation. For instance, the analyzer 102 may be established in a ring buffer or First-In First-Out (FIFO) mode of operation in which a buffer of the database 130 may fill with data until the buffer is full, at which time, the buffer will over write the oldest data in the buffer with the newest data and continue until a scenario run is completed. This mode of operation is especially good when a scenario crashed and provides excellent post-mortem analysis of what messages were being sent when the crash occurred. Further, the analyzer 102 may be established in a single buffer mode of operation in which data is collected at the start time (which is dictated by user input) and collects data until the end time (which is dictated by user input) or, until a buffer of the database 130 is full. This mode may be useful when a number of filters have been created but are collecting very specific data within a limited time frame.

In exemplary embodiments of the present disclosure, the start time, as previously described, is the time the filter begins its operation on the captured data. Any data captured prior to the start time is discarded for this particular filter. Further, the end time, as previously described, is the time the filter terminates its operation on the captured data. Any data captured after the end time is discarded for this particular filter.

In embodiments of the present disclosure, as noted above, the user input window 500 may include source node and destination node fields. Entries to these fields may describe the source and destination nodes as binding or non-binding nodes of interest. Non-binding nodes of interest may refer to nodes that are not necessarily the source and destination of a particular message. If two nodes are referenced in the user input window (ex.—user input filter) 500 as non-binding source node and destination node, with a logic expression field entry of "OR", then the associated destination node and source node do not have to correspond with those provided in the user input filter 500. Further, binding nodes of interest may refer to nodes which are necessarily the source and destination nodes of a particular message. If two nodes are referenced in the user input filter 500 as binding source node and destination node with a logic expression field entry of "AND", then the associated destination node and source node must correspond with those provided in the user input filter 500.

Figure 6:
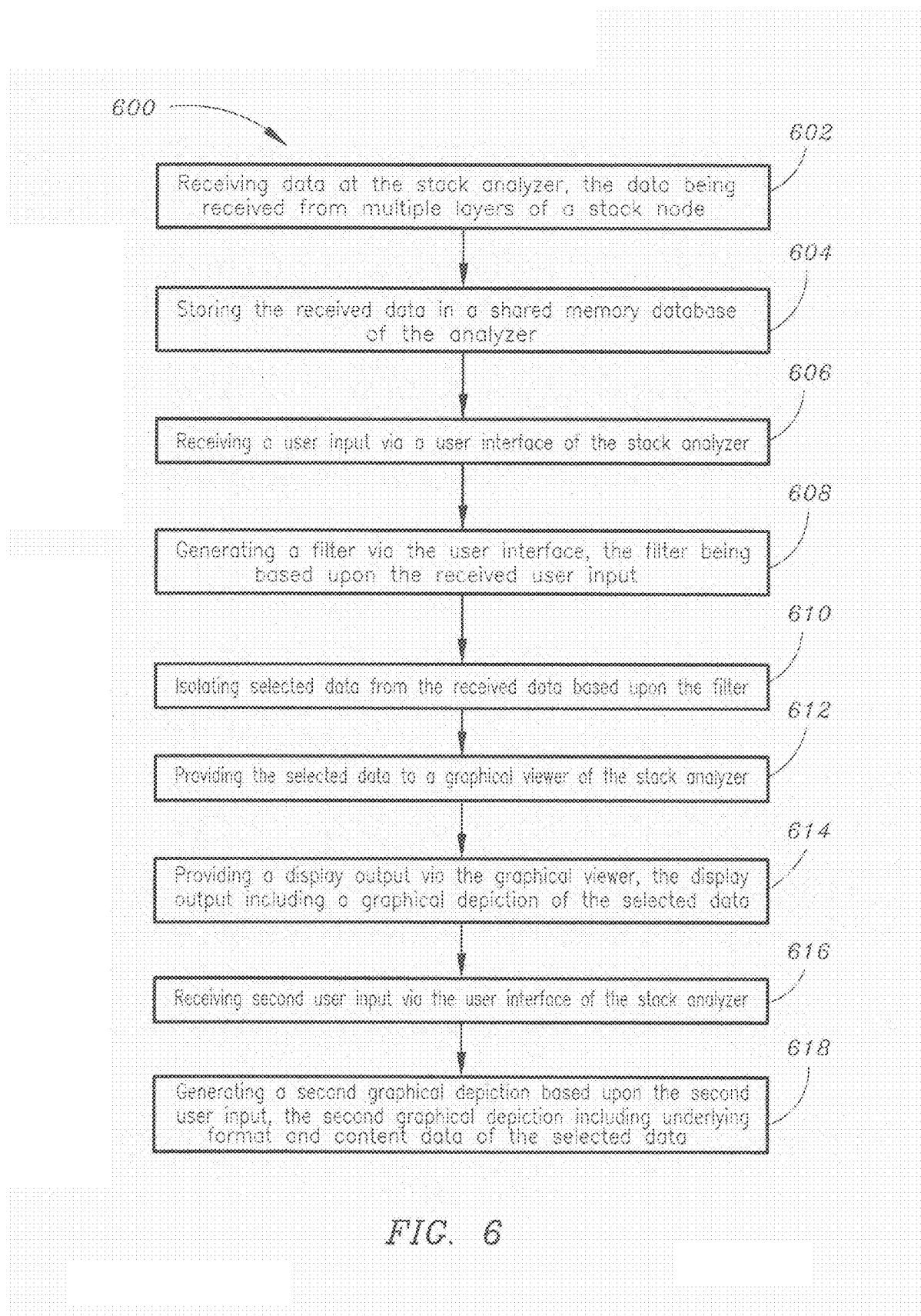
FIG. 6 is a flowchart illustrating a method for displaying selected data via a universal stack analyzer (such as the universal stack analyzer shown in FIG. 1) in accordance with an exemplary embodiment of the present disclosure.

Referring to FIG. 6, a flowchart illustrating a method for displaying selected data via a universal stack analyzer (such as the universal stack analyzer 102 shown in FIG. 1) in accordance with an exemplary embodiment of the present invention is provided. The method 600 may include the step of receiving data at the stack analyzer, the data being received from multiple layers of a stack node 602. The method 600 may further include the step of storing the received data in a shared memory database of the analyzer 604. The method 600 may further include the step of receiving a user input via a user interface of the stack analyzer 606. The method 600 may further include the step of generating a filter via the user interface, the filter being based upon the received user input 608. The method 600 may further include the step of isolating selected data from the received data based upon the filter 610. The method 600 may further include the step of providing the selected data to a graphical viewer of the stack analyzer 612. The method 600 may further include the step of providing a display output via the graphical viewer, the display output including a graphical depiction of the selected data 614. The method 600 may further include the step of receiving a second user input via the user interface of the stack analyzer 616. The method 600 may further include the step of generating a second graphical depiction based upon the second user input, the second graphical depiction including underlying format and content data of the selected data 618. In exemplary embodiments isolation of the selected data from the received data (ex.—filtering) may be performed by the parser 136 and/or the WireShark viewer 134.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a non-transitory computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A universal stack analyzer, comprising:
    a shared memory database;
    a user interface, the user interface being connected to the shared memory database;
    a parser, the parser being connected to the user interface and the shared memory database; and
    a graphical viewer, the graphical viewer being connected to the parser,
    wherein the universal stack analyzer is configured for:
        receiving data at the shared memory database from multiple layers of at least one stack node connected to the universal stack analyzer, the multiple layers of the at least one stack node including at least one of: an application layer, a first general purpose process layer, a first radio security services layer, a cryptographic sub-system layer, a second radio security services layer, a second general purpose process layer and a field programmable gate array layer, the at least one stack node communicatively coupled with a first local area network and a second local area network;
        parsing selected data from the shared memory database by the parser, the selected data including a node source and node destination specified by a user via the user interface; and
        providing a graphical depiction of the selected data included in the received data via the graphical viewer.

2. A universal stack analyzer as claimed in claim 1, wherein the shared memory database receives the data directly from the stack node via a data bus.

3. A universal stack analyzer as claimed in claim 1, further comprising:
    a collector, the collector being connected to the shared memory database.

4. A universal stack analyzer as claimed in claim 3, wherein the collector receives the data from the stack node and provides the received data to the shared memory database.

5. A universal stack analyzer as claimed in claim 1, wherein the selected data is determined based upon a user input provided via the user interface.

6. A universal stack analyzer as claimed in claim 5, wherein the user interface generates a filter based upon the user inputs provided via the user interface and provides the filter to the parser.

7. A universal stack analyzer as claimed in claim 6, wherein the parser, based upon the filter, isolates the selected data from the received data and provides the selected data to the graphical viewer.

8. A universal stack analyzer as claimed in claim 7, wherein the graphical viewer, based upon the selected data received from the parser, provides a display output including the graphical depiction of the selected data.

9. A universal stack analyzer as claimed in claim 1, further comprising:
    a WireShark viewer, the WireShark viewer being connected to the shared memory database, the user interface and the parser, wherein the WireShark viewer, based upon a filter generated by the user interface, isolates the selected data from the received data and provides the selected data to the graphical viewer via the parser.

10. A universal stack analyzer as claimed in claim 1, wherein the universal stack analyzer is waveform agnostic.

11. A method for displaying selected data via a universal stack analyzer, the method comprising:
    receiving data at the universal stack analyzer, the data being received from multiple layers of at least one stack node, the multiple layers of the at least one stack node including at least one of: an application layer, a first general purpose process layer, a first radio security services layer, a cryptographic sub-system layer, a second radio security services layer, a second general purpose process layer and a field programmable gate array layer, the at least one stack node communicatively coupled with a first local area network and a second local area network;

storing the received data in a shared memory database of the analyzer;

receiving a user input via a user interface of the stack analyzer;

generating a filter via the user interface, the filter being based upon the received user input;

isolating selected data from the received data based upon the filter, the selected data including a node source and node destination specified by the user input;

providing the selected data to a graphical viewer of the stack analyzer; and providing a display output via the graphical viewer, the display output including a graphical depiction of the selected data.

12. A method as claimed in claim 11, further comprising:
receiving a second user input via the user interface of the stack analyzer.

13. A method as claimed in claim 12, further comprising:
generating a second graphical depiction based upon the second user input, the second graphical depiction including underlying format and content data of the selected data.

14. A method as claimed in claim 11, wherein a parser of the stack analyzer isolates the selected data based upon the filter.

15. A method as claimed in claim 11, wherein a WireShark viewer of the stack analyzer isolates the selected data based upon the filter.

16. A computer program product, comprising:
a non-transitory computer-readable storage medium including non-transitory computer-usable program code embodied therein for performing displaying selected data via a universal stack analyzer, the computer readable program code comprising instructions which, when executed by a computer device or processor, perform and direct the steps of:

receiving data at the stack analyzer, the data being received from multiple layers of at least one stack node, the multiple layers of the at least one stack node including at least one of: an application layer, a first general purpose process layer, a first radio security services layer, a cryptographic sub-system layer, a second radio security services layer, a second general purpose process layer and a field programmable gate array layer, the at least one stack node communicatively coupled with a first local area network and a second local area network;

storing the received data in a shared memory database of the analyzer;

receiving a user input via a user interface of the stack analyzer;

generating a filter via the user interface, the filter being based upon the received user input;

isolating selected data from the received data based upon the filter;

providing the selected data to a graphical viewer of the stack analyzer; and providing a display output via the graphical viewer, the display output including a graphical depiction of the selected data.

17. A computer program product as claimed in claim 16, further comprising:
computer-usable program code for receiving a second user input via the user interface of the stack analyzer.

18. A computer program product as claimed in claim 17, further comprising:
computer-usable program code for generating a second graphical depiction based upon the second user input, the second graphical depiction including underlying format and content data of the selected data.

19. A computer program product as claimed in claim 16, wherein a parser of the stack analyzer isolates the selected data based upon the filter.

20. A computer program product as claimed in claim 16, wherein a WireShark viewer of the stack analyzer isolates the selected data based upon the filter.

* * * * *